(12) United States Patent
Sefidvash

(10) Patent No.: US 6,906,426 B2
(45) Date of Patent: Jun. 14, 2005

(54) TRANSCEIVER HAVING SHADOW MEMORY FACILITATING ON-TRANSCEIVER COLLECTION AND COMMUNICATION OF LOCAL PARAMETERS

(75) Inventor: Khorvash Sefidvash, Laguna Niguel, CA (US)

(73) Assignee: Broadcom Corporation, Irvine, CA (US)

( * ) Notice: Subject to any disclaimer, the term of this patent is extended or adjusted under 35 U.S.C. 154(b) by 72 days.

(21) Appl. No.: 10/340,295

(22) Filed: Jan. 9, 2003

(65) Prior Publication Data

US 2004/0026793 A1 Feb. 12, 2004

Related U.S. Application Data

(60) Provisional application No. 60/401,979, filed on Aug. 7, 2002.

(51) Int. Cl.[7] .............................................. H01L 29/72
(52) U.S. Cl. ........................ 257/778; 710/46; 710/305; 375/364
(58) Field of Search ........................... 257/778; 710/46, 710/305; 375/364

(56) References Cited

U.S. PATENT DOCUMENTS 6,065,073 A * 5/2000 Booth ........................ 710/46
2001/0016021 A1   8/2001 Chan 2002/0181633 A1 * 12/2002 Trans ......................... 375/354
2003/0217215 A1 * 11/2003 Taborek et al. .............. 710/305

FOREIGN PATENT DOCUMENTS

EP             0 967 758 A      12/1999
WO            WO 00 65772       11/2000

OTHER PUBLICATIONS

Dieter Japel, et al., *LAN/ISDN Interconnect Via Frame Relay*, Nov. 28, 1988, pp. 1791–1797, Conference Proceedings Article, Switzerland.

Bai Yong, et al., *Performance of TCP/IP over IS–2000 Based CDMA Radio Links*, Sep. 24, 2000, pp. 1036–1040, vol. 3, Conference Proceedings Article, New Jersey.

Bai Yong, et al., *TCP over Asymmetric CDMA Radio Links*, Sep. 24, 2000, pp. 1015–1018, vol. 3, Conference Proceedings Article, New Jersey.

* cited by examiner

*Primary Examiner*—Edward Wojciechowicz
(74) *Attorney, Agent, or Firm*—McAndrews, Held & Malloy, Ltd.

(57) ABSTRACT

The present invention relates to a register for a single chip multi-sublayer PHY. More specifically, the present invention relates to a transceiver module including a single chip multi-layer PHY having one or more shadow registers. The transceiver module includes one or more storage modules adapted to store transceiver module local data. The shadow registers are adapted to facilitate collection of the local data from the storage modules and communicate the collected data to another portion of the transceiver module and/or to the upper lever system using at least one interface communicating with the shadow register.

22 Claims, 10 Drawing Sheets

US 6,906,426 B2

TRANSCEIVER HAVING SHADOW MEMORY FACILITATING ON-TRANSCEIVER COLLECTION AND COMMUNICATION OF LOCAL PARAMETERS

CROSS-REFERENCE TO RELATED APPLICATIONS/INCORPORATION BY REFERENCE

This application is related to, and claims benefit of and priority from, Provisional Application No. 60/401,979 filed on Aug. 7, 2002 titled "Transceiver Having Shadow Memory Facilitating On-Transceiver Collection and Communication of Local Parameters", the complete subject matter of which is incorporated herein by reference in its entirety.

U.S. Pat. No. 6,424,194, U.S. application Ser. No. 09/540,243 filed on Mar. 31, 2000, U.S. Pat. No. 6,389,092, U.S. Pat. No. 6,340,899, U.S. application Ser. No. 09/919,636 filed on Jul. 31, 2001, U.S. application Ser. No. 09/860,284 filed on May 18, 2001, U.S. application Ser. No. 10/028,806 filed on Oct. 25, 2001, U.S. application Ser. No. 09/969,837 filed on Oct. 1, 2001, U.S. application Ser. No. 10/159,788 entitled "Phase Adjustment in High Speed CDR Using Current DAC" filed on May 30, 2002, U.S. application Ser. No. 10/179,735 entitled "Universal Single-Ended Parallel Bus; fka, Using 1.8V Power Supply in 0.13 MM CMOS" filed on Jun. 21, 2002, and U.S. Application Serial No. 60/402,097 entitled "System And Method For Implementing A Single Chip Having A Multiple Sub-Layer Phy" filed on Aug. 7, 2002 and U.S. application Ser. No. 10/282,933 entitled "System And Method For Implementing A Single Chip Having A Multiple Sub-Layer Phy" filed on Oct. 29, 2002 are each incorporated herein by reference in their entirety.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND OF THE INVENTION

Embodiments of the present invention relate generally to a method and system for collecting and communicating local parameters and more particularly for a transceiver having a memory to facilitate collection and communication of local parameters.

High-speed digital communication networks over copper and optical fiber are used in many network communication and digital storage applications. Ethernet and Fibre Channels are two widely used communication protocols that continue to evolve in response to the increasing need for higher bandwidth in digital communication systems.

The Open Systems Interconnection (alternatively referred to as the "OSI") model (ISO standard) was developed to establish standardization for linking heterogeneous computer and communication systems. The OSI model includes seven distinct functional layers including Layer 7: an application layer; Layer 6: a presentation layer; Layer 5: a session layer; Layer 4: a transport layer; Layer 3: a network layer; Layer 2: a data link layer; and Layer 1: a physical layer. Each OSI layer is responsible for establishing what is to be done at that layer of the network but not how to implement it.

Layers 1 to 4 handle network control, and data transmission and reception. Layers 5 to 7 handle application issues. It is contemplated that specific functions of each layer may vary to a certain extent, depending on the exact requirements of a given protocol to be implemented for that layer. For example, the Ethernet protocol provides collision detection and carrier sensing in the physical layer.

The physical layer (i.e., Layer 1) is responsible for handling all electrical, optical, and mechanical requirements for interfacing to the communication media. The physical layer provides encoding and decoding, synchronization, clock data recovery, and transmission and reception of bit streams. Typically, high-speed electrical or optical transceivers are the hardware elements used to implement such layer.

As data rate and bandwidth requirements increase, 10 Gigabit data transmission rates are being developed and implemented in high-speed networks. Pressure exists to develop a 10 Gigabit physical layer for high-speed serial applications. Transceivers for 10 G applications are needed for the 10 G physical layer. The specification IEEE P802.3ae draft 5 describes the physical layer requirements for 10 Gigabit applications and is incorporated herein by reference in its entirety.

An optical-based transceiver, for example, includes various functional components such as clock data recovery, clock multiplication, serialization/deserialization, encoding/decoding, electrical/optical conversion, descrambling, media access control, controlling, and data storage. Many of the functional components are often implemented in separate IC chips.

Currently, it is desirable to access the various components of the transceiver to collect status data to determine if the transceiver is operating properly. However, this collection requires multiple accesses to the transceiver using multiple MDIO interfaces, for example. In other words, in typical systems, a separate MDIO interface is used to provide the transceiver access to off-transceiver status data. This requires controller interaction with the transceiver each time the transceiver accesses the off-transceiver data. As a result, system performance may be compromised (e.g., slowed). Further, the data must be collected and processed separately.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Aspects of the present invention relate to shadow registers. More specifically, the present invention relates to a transceiver module including a single chip multi-layer PHY having one or more shadow registers. The transceiver module includes one or more storage modules adapted to store transceiver module local data. The shadow registers are adapted to facilitate collection of the local data from the storage modules and communicate the collected data to another portion of the transceiver module and/or to the upper level system using at least one interface communicating with the shadow register.

One embodiment of the present invention relates to a single chip multi-sublayer PHY system. In this embodiment, the single chip multi-sublayer PHY system comprises at least one register adapted to collect and or store local data and at least one interface communicating with the register. Another embodiment of the present invention comprises at least one transmit module, where the at least one transmit module comprises PMD and XAUI transmit modules. Still another embodiment of the present invention comprises least one receive module, where the at least one receive module comprises PMD and XAUI receive modules.

Another embodiment of the present invention relates to a to a single chip multi-sublayer PHY system, where the at least one interface comprises a management data input/output interface, an XAUI transmit and receive interface, a PMD transmit and receive interface and/or two interfaces adapted to communicate with at least one EEPROM. The XAUI transmit and receive interface may further comprise 4 channels of 3 Gigabit data received by and 4 channels of 3 Gigabit data transmitted by the single chip multi-sublayer PHY, while the PMD transmit and receive interface may comprise a 10 Gigabit serial transmit differential interface and a 10 Gigabit serial receive differential interface. The two interfaces adapted to communicate with the at least one EEPROM may comprise a 2-wire controller communicating with at least one register and the two interfaces.

Yet another embodiment of the present invention relates to a transceiver. In this embodiment, the transceiver comprises at least one storage module adapted to store transceiver local data and a single chip multi-sublayer PHY. The single chip multi-sublayer PHY may comprise at least one register adapted to facilitate collection of the transceiver local data from the at least one storage module; and at least one interface communicating with at least the register and adapted to read the collected transceiver local data. In this embodiment, the transceiver may further comprise least one optical PMD communicating with the single chip multi-sublayer PHY using at least one PMD transmit and receive interface.

Another embodiment relates to a method of collecting and communicating local status data of a transceiver using a single chip multi-sublayer PHY. This method comprises collecting the local status data using at least one transceiver memory module and collecting the local status data from the transceiver memory module using at least one register on the single chip multi-sublayer PHY. The collected local status data is communicated to the transceiver or upper level system using at least one interface coupled to at least the single chip multi-sublayer PHY.

These and other advantages, aspects and novel features of the present invention, as well as details of an illustrated embodiment thereof, will be more fully understood from the following description and drawings.

DETAILED DESCRIPTION OF THE INVENTION

Figure 1:
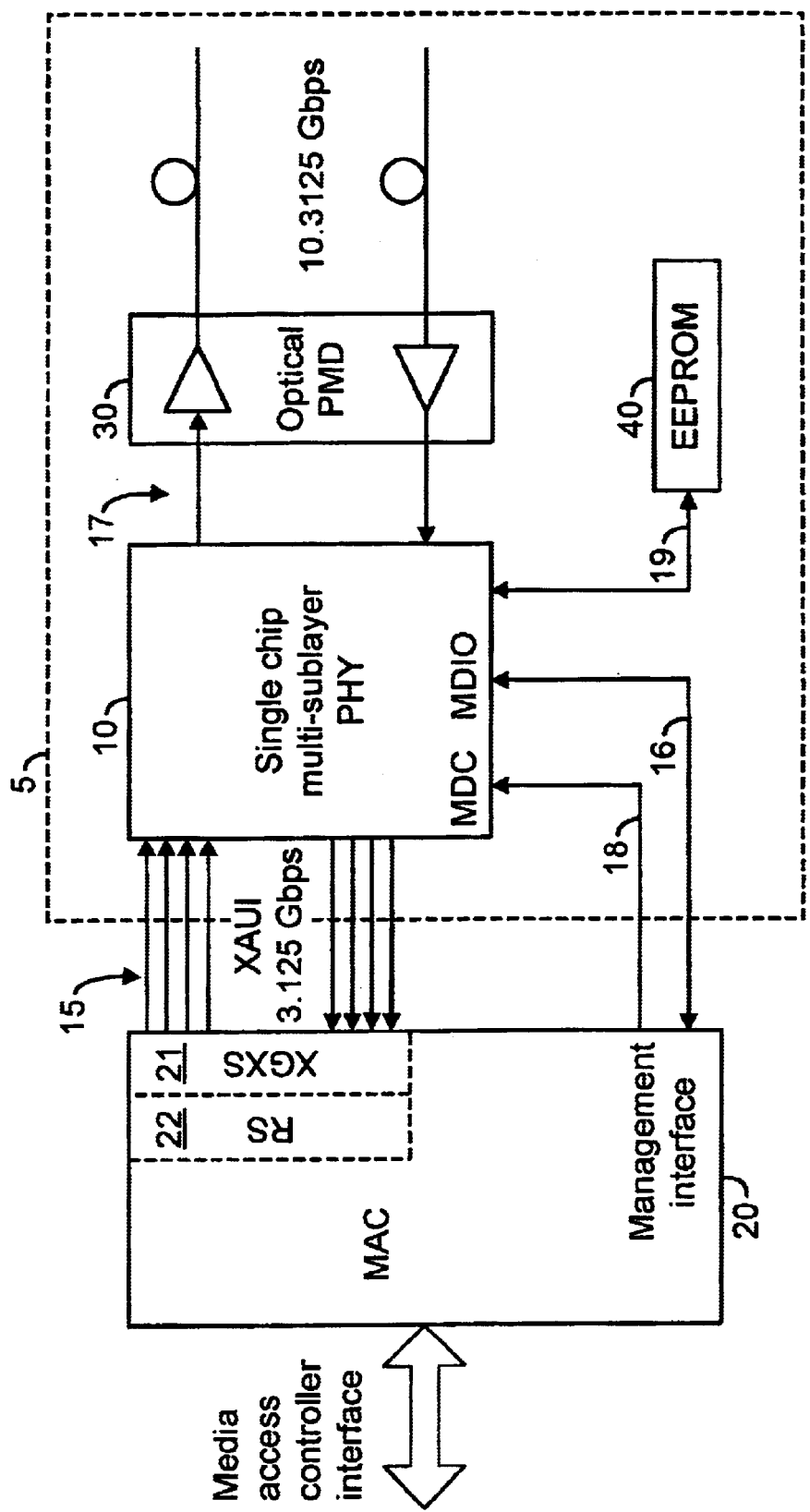
FIG. 1 illustrates a block diagram of a transceiver in accordance with one embodiment of the present invention.

FIG. 1 illustrates a schematic block diagram illustrating certain components of a 10 Gigabit transceiver module, generally designated 5, with a XAUI interface 15 in accordance with an embodiment of the present invention. The transceiver module 5 may, in one embodiment of the present invention, be compatible with the XENPAK optical module standard. The transceiver module 5 includes, for example, a single-chip multi-sublayer PHY 10, an optical PMD 30, and an EEPROM 40.

According to an embodiment of the present invention, a media access controller (alternatively referred to as "MAC") 20 interfaces to the single-chip multi-sublayer PHY 10 through the XAUI transmit and receive interface 15. In general, the MAC layer comprises one of two sublayers of the data link control layer and is concerned with sharing the physical connection to a network among several upper-level systems. In this embodiment, the single-chip multi-sublayer PHY 10 interfaces to the optical PMD 30 through a PMD transmit and receive interface 17. The MAC 20 also interfaces to the single-chip multi-sublayer PHY 10 through the serial management data input/output (alternatively referred to as an "MDIO") interface 16. The single-chip multi-sublayer PHY 10 also interfaces to EEPROM 40 through a two-wire serial interface 19. In this embodiment, a XGMII interface is not used.

The XAUI interface 15 comprises 4 channels of 3 Gigabit serial data received by the single-chip multi-sublayer PHY 10 from the MAC 20 and 4 channels of 3 Gigabit serial data transmitted from the single-chip multi-sublayer PHY 10 to the MAC 20. In an embodiment of the present invention, the MAC 20 includes a XGXS sublayer interface 21 and a reconciliation sublayer or RS interface 22. In one embodiment of the present invention, for Ethernet operation for example, the 3 Gigabit data rate is actually 3.125 Gbps and for Fibre Channel operation for example, the 3 Gigabit data rate is actually 3.1875 Gbps.

The PMD interface 17 comprises a 10 Gigabit serial transmit differential interface and a 10 Gigabit serial receive differential interface between the single-chip multi-sublayer PHY 10 and the optical PMD 30 in accordance with an embodiment of the present invention. In one embodiment of the present invention, for Ethernet operation for example, the 10 Gigabit data rate is actually 10.3125 Gbps and for Fibre Channel operation for example, the 10 Gigabit data rate is actually 10.516 Gbps.

Figure 2:
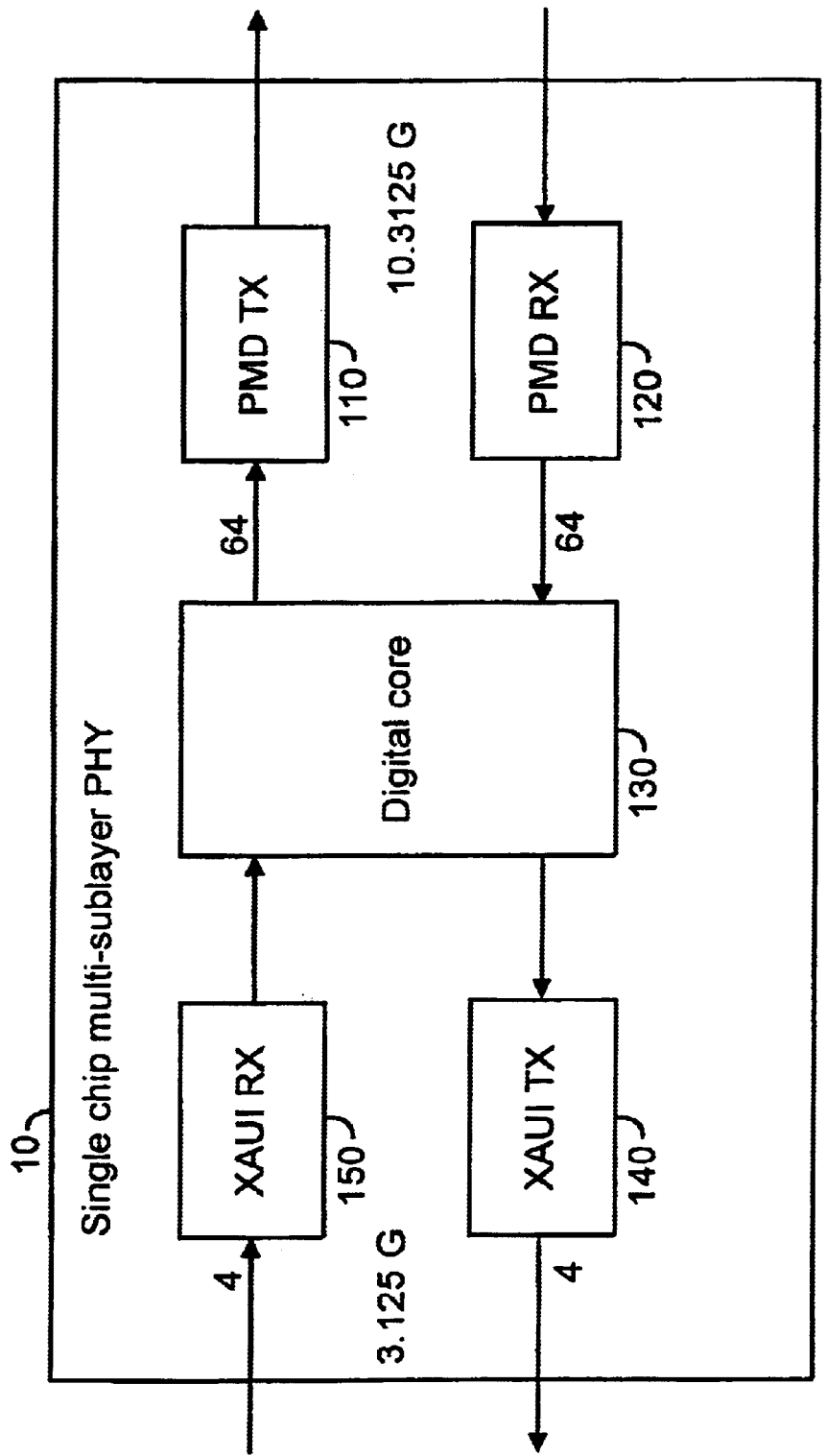
FIG. 2 illustrates a block diagram of a single chip multi-sublayer PHY similar to that of FIG. 1 in accordance with one embodiment of the present invention.

FIG. 2 illustrates a schematic block diagram of the single-chip multi-sublayer PHY 10 used in the transceiver module 5 of FIG. 1 in accordance with an embodiment of the present invention. The single-chip multi-sublayer PHY 10 comprises a PMD transmit (alternatively referred to as "TX") module 110, a PMD receive (alternatively referred to as "RX") module 120, a digital core module 130, a XAUI transmit or TX section 140, and a XAUI receive or RX module 150.

Figure 3:
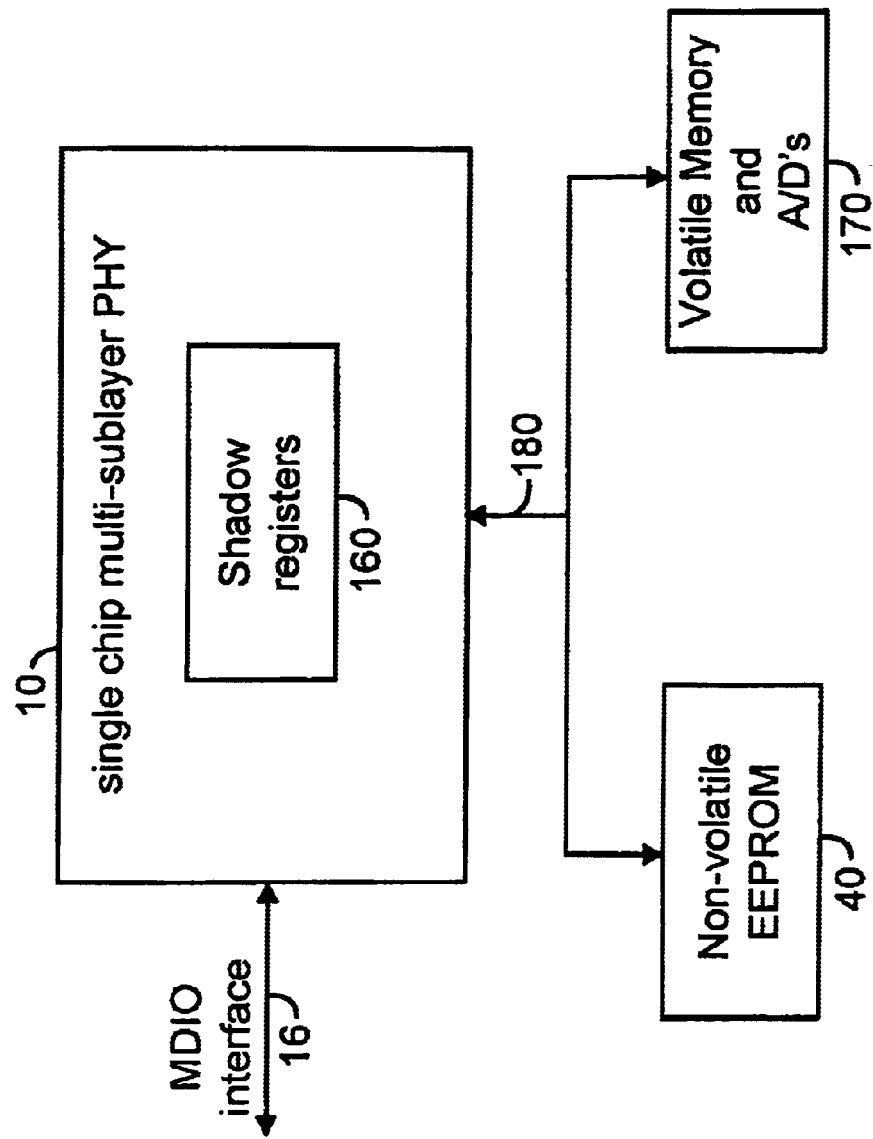
FIG. 3 illustrates a block diagram of a single chip multi-sublayer PHY including shadow registers similar to that of FIG. 2 in accordance with one embodiment of the present invention.

In a first exemplary embodiment illustrated in FIG. 3, the single chip multi-sublayer PHY 10 comprises at least one shadow register 160. While only one shadow register 160 is illustrated, two or more shadow registers are contemplated. In this embodiment, the shadow register 160 is adapted to facilitate on-transceiver collection and communication of local parameters. More specifically, the present invention relates to a chip that is adapted to capture data (i.e., local status data of the transceiver for example), store the local data in the one or more shadow registers 160, process the data if applicable and communicate the processed or unprocessed data to the transceiver or upper level system.

FIG. 3 further illustrates at least two interfaces communicating with the single chip multi-sublayer PHY 10. The first interface is the MDIO interface 16 that communicates with at least the single chip multi-sublayer PHY 10. The second interface 180 comprises one or more interfaces adapted to enable the single chip multi-sublayer PHY 10 to communicate with the non-volatile EEPROM 40 and one or more volatile memories and A/D converters 170.

In an embodiment of the present invention, the non-volatile EEPROM 40 is adapted to store and provide data (configuration data or customer writable data for example) to the single chip multi-sublayer PHY 10. Upon power up of the device, the single chip multi-sublayer PHY is adapted to read the data from the non-volatile EEPROM (alternatively referred to as "configuration data"), which may be used to compare with local status data as discussed below.

The one or more volatile memories and A/D converters (alternatively referred to as "local memories") 170 are further adapted to capture status data. More specifically, the local memories are adapted to communicate with and capture status data (including, for example, alarm/warning thresholds, vendor specific data, optical alarm and warning data which may be alternatively referred to as "local data") from the transceiver or other device. The single chip multi-sublayer PHY 10 communicates with the local memories, capturing and storing such local data. Local data as used herein may be, for example, data associated with one or both of the single-chip multi-sublayer 10 or the module 5.

In one embodiment of the present invention, the single chip multi-sublayer PHY 10 communicates the captured local data directly to another portion of the transceiver module and/or to the upper level system using the MDIO interface 16. In other words, the one or more shadow registers collect the local data from the local memories, directly communicate such collected local data and/or store it until it is called for or retrieved. For example, the single chip multi-sublayer PHY may collect the operating temperature of one or more portions of the transceiver module, which is stored in a local memory 170, and communicate that information to another portion of the transceiver module and/or to the upper level system.

In another embodiment of the present invention, the single chip multi-sublayer PHY processes the local data prior to its communication to another portion of the transceiver module and/or to the upper level system. For example, the single chip multi-sublayer PHY 10 may compare such local data to the configuration data to determine if the transceiver module is operating within specifications, and transmit such information to another portion of the transceiver module and/or to the upper level system. It is also contemplated that, in one embodiment, the single chip multi-sublayer PHY 10 may also process the local data by comparing it to the specification or other data, and generating one or more flags as required. For example, the single chip multi-sublayer PHY may capture the operating temperature of one or more portions of the transceiver module stored in a local memory, compare the temperature with the specification data and generate a flag if such temperature falls outside or exceeds the specification data. It is also contemplated that the single chip multi-sublayer PHY may generate a flag indicating that the local status data is within the specifications or do nothing. [Please confirm]

Figure 4:
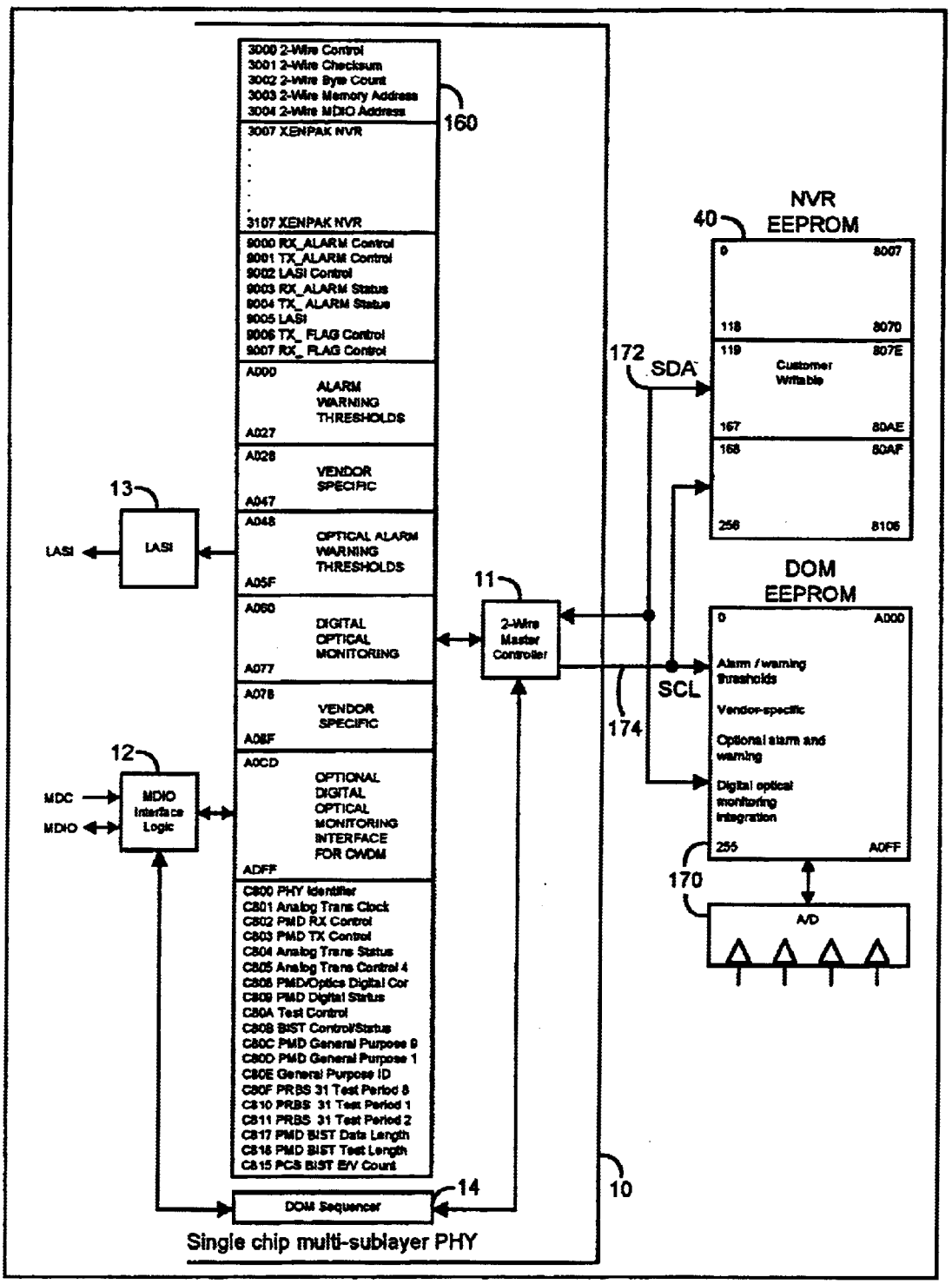
FIG. 4 illustrates a block diagram of the shadow registers and the EEPROMS in accordance with one embodiment of the present invention.

FIG. 4 illustrates another embodiment of the single chip multi-sublayer PHY 10 including shadow registers 160 in accordance with the present invention. In this illustrated embodiment, a first or NVR EEPROM 40 and a second or DOM EEPROM 170 are illustrated communicating with the shadow registers through SDA and SCL interfaces 172 and 174 respectively and a 2-WIRE master controller 11. One or more A/D converters are further illustrated communicating with one or more of the EEPROMS (the second or DOM EEPROM for example). While only two EEPROMS are illustrated, more than two EEPROMS (i.e., one NVR EEPROM and a plurality of DOM EEPROMS for example) are contemplated.

The shadow register 160, which is illustrated storing local data (e.g., wire control, wire checksum, alarm control, etc.) captured from the first or second EEPROMS and the local registers, communicates with the MDIO 16 and MDC 18 via the MDIO interface logic 12 and the LASI via the LASI module 13. Further, the 2-WIRE master controller 11 is illustrated communicating with the MDIO interface logic 12 via a DOM sequencer 14.

Figure 5:
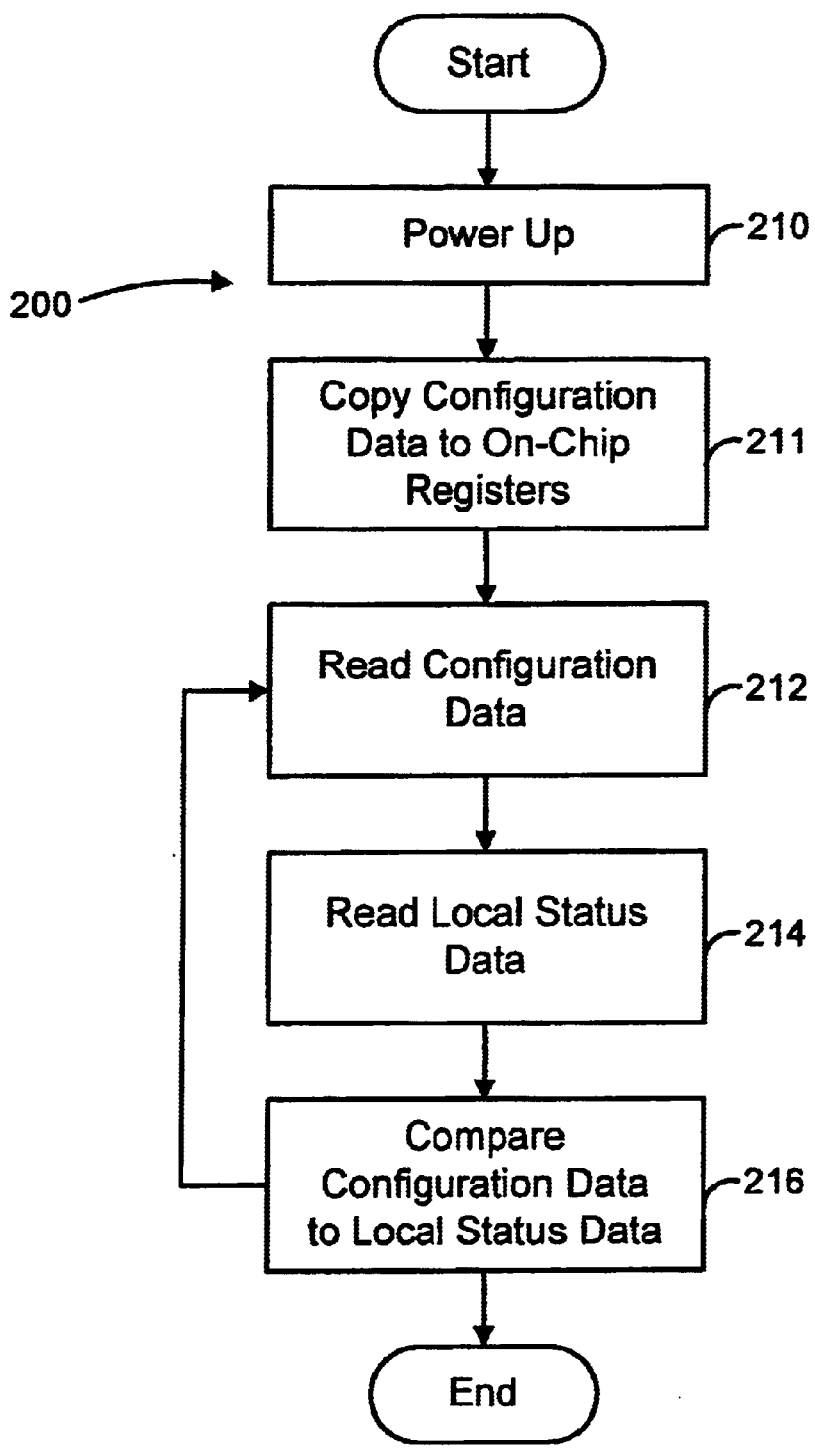
FIG. 5 illustrates a high level flow diagram of a method for storing and providing data using a single chip multi-sublayer PHY in accordance with one embodiment of the present invention.

FIG. 5 illustrates a high level flow diagram of an embodiment of the present invention relating to a method for storing and providing local data, generally designated 200. Upon power up, the single chip multi-sublayer PHY is adapted to copy the configuration data to one or more on-chip registers and read such configuration data from the register as illustrated by blocks 210, 211 and 212 respectively. The single chip multi-sublayer PHY is further adapted to read the local status data from the one or more shadow registers as illustrated by block 214. The single chip multi-sublayer PHY may compare the configuration data to the local status data as illustrated by block 216. It is contemplated that this method of storing and providing local data may be performed on a limited basis (only once or a predetermined number of times for example) or may be employed continuously or repetitively.

Figure 6:
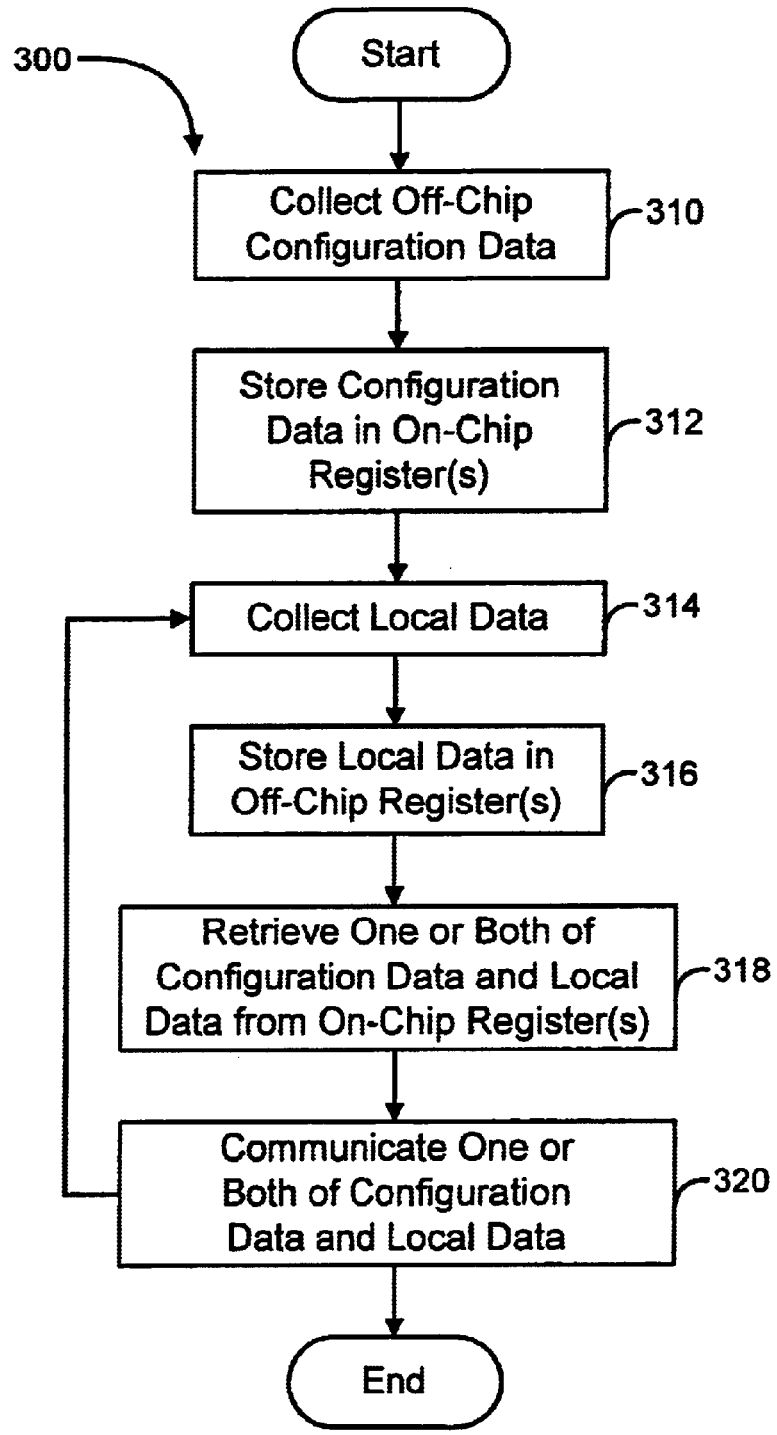
FIG. 6 illustrates a high level flow diagram of a method of collecting and communicating local data using a single chip multi-sublayer PHY in accordance with one embodiment of the present invention.

FIG. 6 illustrates a high level flow diagram of an embodiment of the present invention relating to a method, generally designated 300, of collecting and communicating data, more specifically collecting and communicating transceiver local status data to an upper level system. This method comprises collecting off-chip configuration data as illustrated by block 310. In this embodiment, the configuration data is stored in one or more registers on the single chip multi-sublayer PHY (i.e., on-chip registers) as illustrated by block 312.

Method 300 further comprises collecting the local status data as illustrated by block 314. In one embodiment, the local status data is collected using at least one transceiver module memory and stored in one or more on-chip registers as illustrated by block 316. The collected local status data, the collected configuration data or both are retrieved from the on-chip registers and communicated, to another portion of the transceiver module and/or to upper level system for example, as illustrated by blocks 318 and 320. In this embodiment, one or both of the collected local status data and the configuration data is communicated to another portion of the transceiver module and/or to upper level system using at least one interface coupled to at least the single chip multi-sublayer PHY. It is contemplated that this method of collecting and communicating data may be performed on a limited basis (only once or a predetermined number of times for example) or may be employed continuously or repetitively.

Figure 7A:
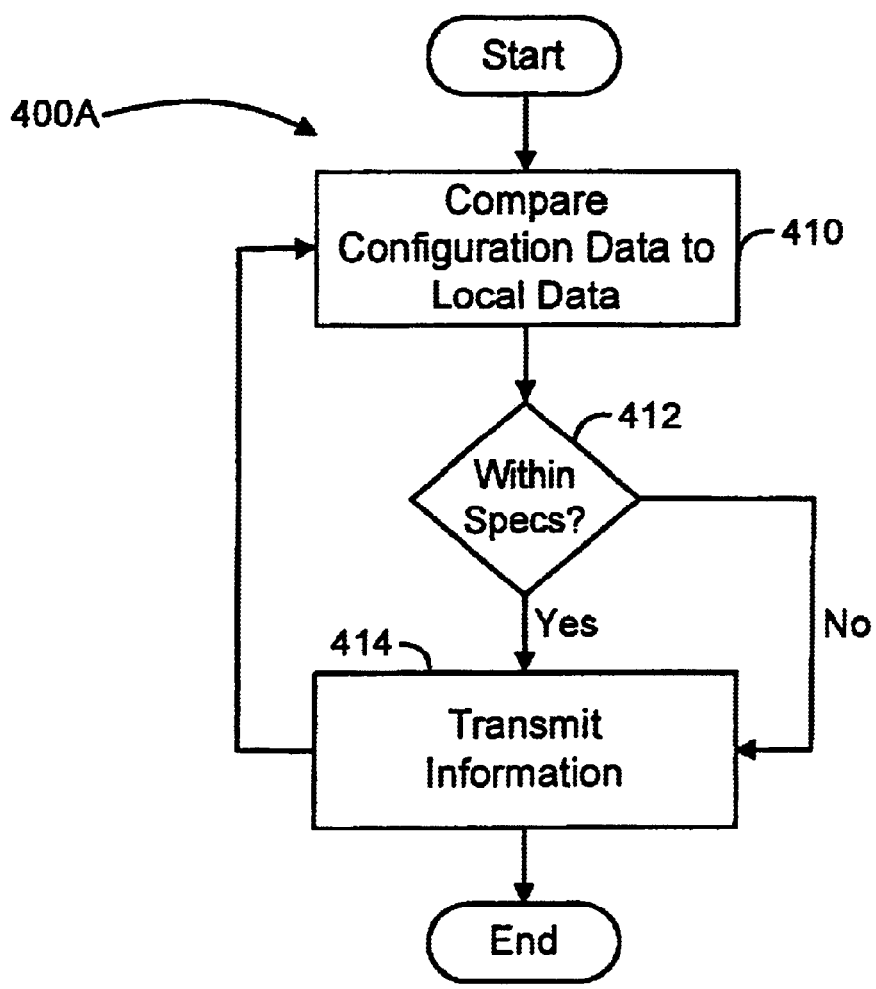
FIGS. 7A and 7B illustrate high level flow diagrams of methods of processing data using a single chip multi-sublayer PHY in accordance with one embodiment of the present invention.
Figure 7B:
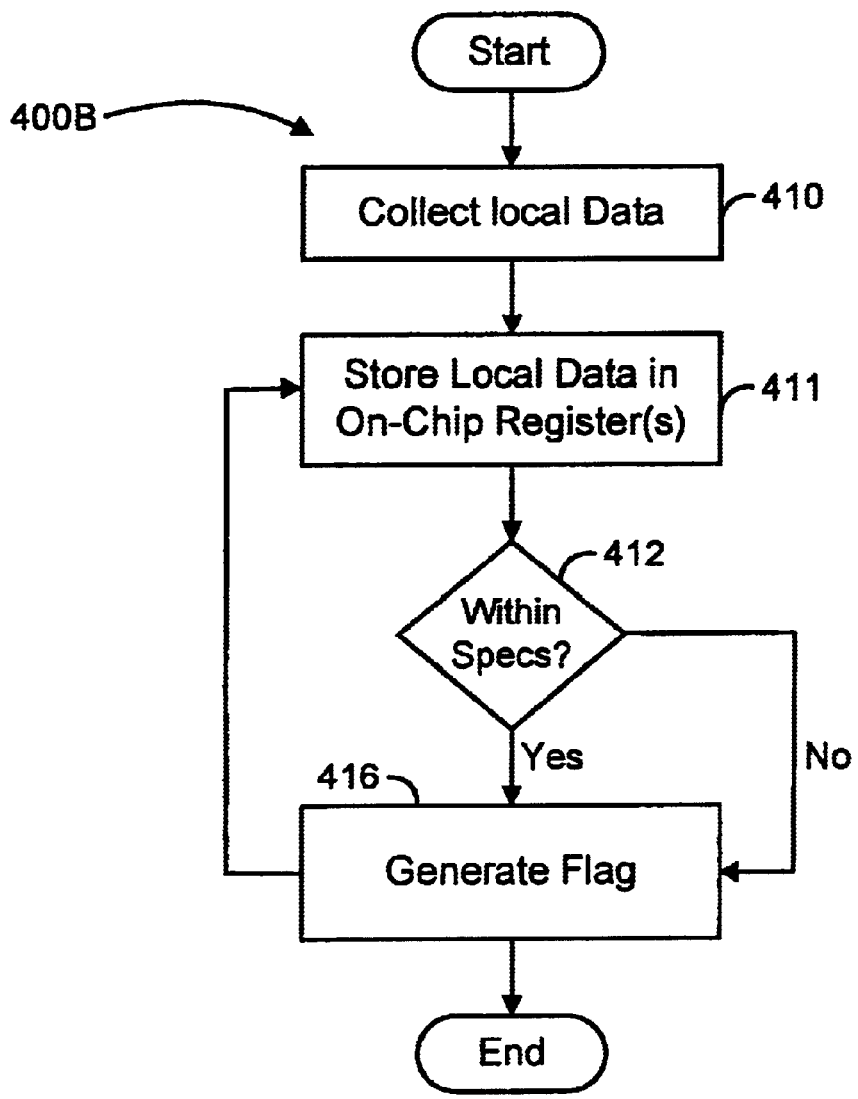

FIGS. 7A and 7B illustrate flow diagrams of embodiments of the present invention relating to methods of processing the local data prior to communicating it, generally designated 400A and 400B in FIGS. 7A and 7B respectively. Method 400A compares the local data to the configuration data as illustrated by block 410, using the single chip multi-sublayer PHY (i.e., using one or more on-chip registers) in accordance with the present invention. The method determines if the transceiver module is operating within spec by determining if the local data is within the specification as illustrated by diamond 412. The single chip multi-sublayer PHY transmits this information (i.e., the result of the determination) to another portion of the transceiver module and/or to the upper level system as illustrated by block 414.

FIG. 7B illustrates method 400B similar to method 400A, wherein the single chip multi-sublayer PHY processes the local data, comparing it to the configuration or other data (using one or more on-chip registers), as illustrated by blocks 410 and 412. However, in illustrated method 400B, one or more flags are generated as required (i.e., when the local data is not within the specifications for example) as illustrated by block 416. It is contemplated that methods 400A and 400B for collecting and communicating data may be performed on a limited basis (only once or a predetermined number of times for example) or may be employed continuously or repetitively.

Figure 8A:
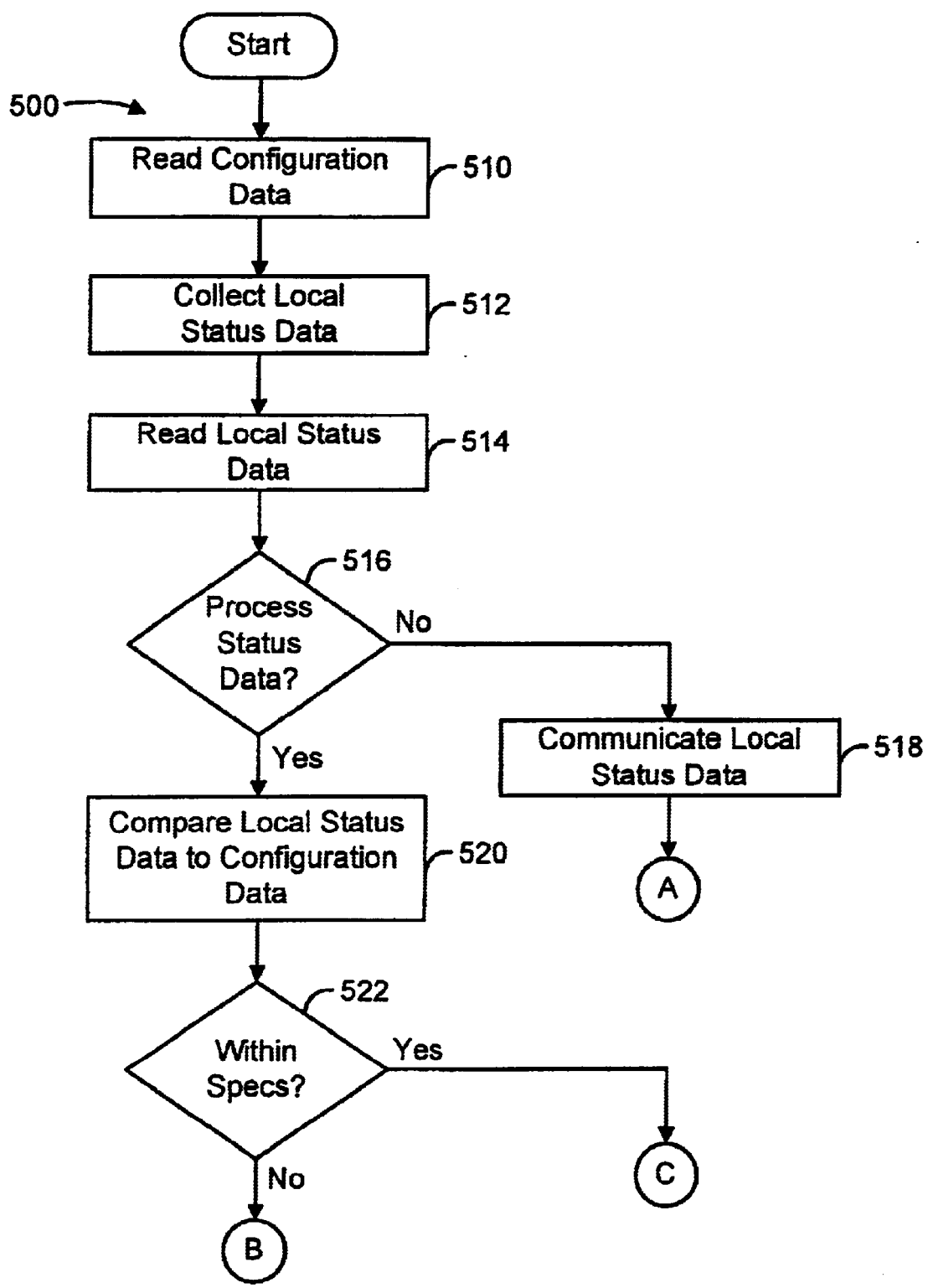
FIGS. 8A and 8B illustrates a high level flow diagram of a method for collecting, processing and communicating data using a single chip multi-sublayer PHY in accordance with one embodiment of the present invention.
Figure 8B:
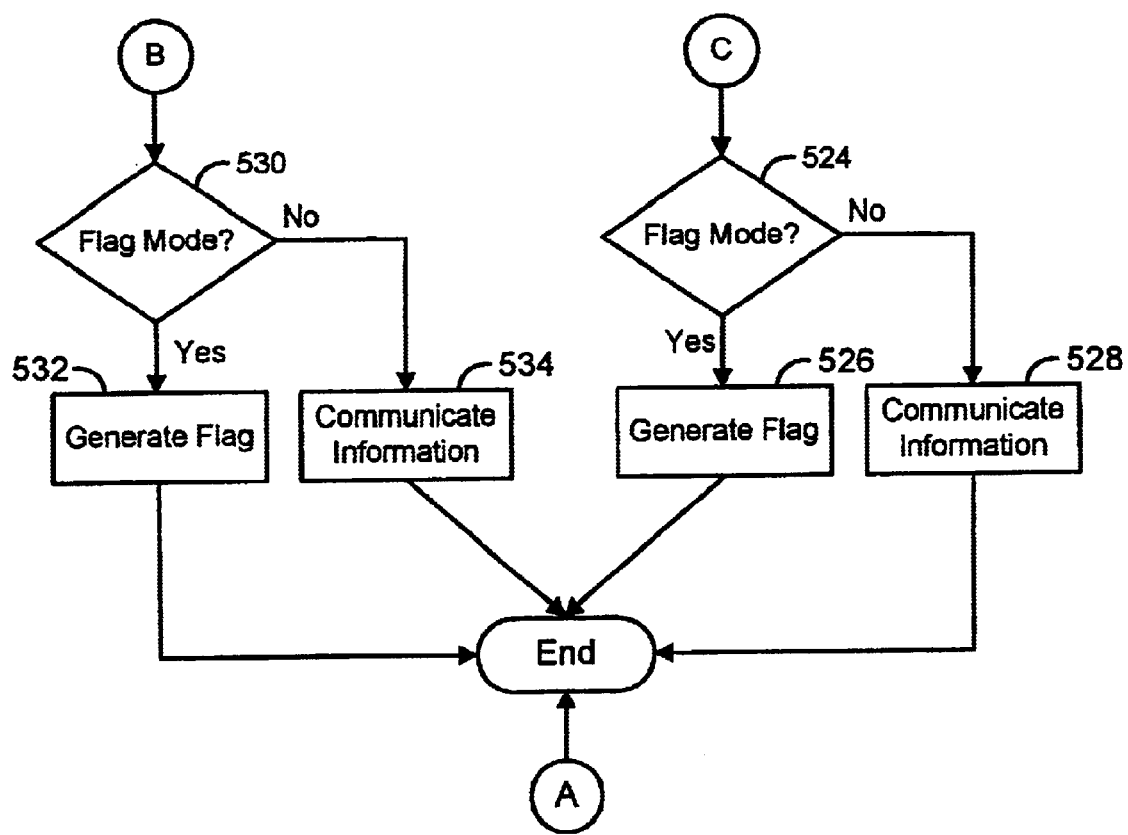

FIGS. 8A and 8B illustrate a flow diagram of an embodiment of the present invention relating to a method of collecting, processing and communicating local data, and generally designated 500. In this embodiment, the single chip multi-sublayer PHY is adapted to read the configuration data from the non-volatile EEPROM as illustrated by block 510, and copy it to one or more on-chip registers. The single chip multi-sublayer PHY is further adapted to collect and read the local status data from the one or more shadow registers as illustrated by blocks 512 and 514, and copy it (i.e., store it) to one or more on-chip registers.

The method determines if the single chip multi-sublayer PHY processes the data as illustrated by diamond 516. If the single chip multi-sublayer PHY does not process the data, the local status data and/or the configuration data is read from the on-chip registers and communicated to another portion of the transceiver module and/or to upper level system as illustrated by block 518. In this embodiment, one of the collected local status data and the configuration data is communicated to another portion of the transceiver module and/or to upper level system using at least one interface coupled to at least the single chip multi-sublayer PHY. In one embodiment of the present invention, the single chip multi-sublayer PHY communicates one of the captured local data and the configuration data directly to another portion of the transceiver module and/or to the upper level system using the MDIO interface. In other words, the shadow registers may collect at least the local data from the local memories and directly communicate at least such collected local data. Alternatively, the single chip multi-sublayer may store at least such collected data until it is called for.

If the local status data is within the specification, the single chip multi-sublayer PHY may do nothing or determine if is in flag mode. That is, it may do nothing or generate one or more flags as illustrated by block 526. If the single chip multi-sublayer PHY is not operating in flag mode, it may directly communicate at least such collected local data as illustrated by block 528 or store it until it is called for. If, however, the single chip multi-sublayer PHY is in flag mode as illustrated by diamond 524, one or more flags may be generated at illustrated by block 516.

If the single chip multi-sublayer PHY or the transceiver is not within spec, the single chip multi-sublayer PHY may do nothing or determine if it is in flag mode as illustrated by diamond 530. It the single chip multi-sublayer PHY is in flag mode, it may do nothing or generate one or more flags as illustrated by block 532. If the single chip multi-sublayer PHY is not operating in flag mode, it may directly communicate at least such collected local data as illustrated by block 532 or store at least such collected data until it is called for. It is contemplated that this method may be performed on a limited basis (only once or a predetermined number of times for example) or may be employed continuously or repetitively.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A single chip multi-sublayer PHY system comprising:
at least one register adapted to store local data; and
two interfaces, at least one of said two interfaces communicating with said register, wherein said two interfaces are adapted to enable communication with at least one EEPROM.

2. The system of claim 1, further comprising at least one transmit module.

3. The system of claim 2, wherein said at least one transmit module comprises PMD and XAUI transmit modules.

4. The system of claim 1, further comprising at least one receive module.

5. The system of claim 4, wherein said at least one receive module comprises PMD and XAUI receive modules.

6. The system of claim 1, wherein said at least one interface comprises a management data input/output interface.

7. The system of claim 1, wherein said at least one interface comprises an XAUI transmit and receive interface.

8. The system of claim 7, wherein said XAUI transmit and receive interface comprises 4 channels of 3 Gigabit data received by and 4 channels of 3Gigabit data transmitted by the single chip multi-sublayer PHY.

9. The system of claim 1, wherein said at least one interface comprises a PMD transmit and receive interface.

10. The system of claim 9, wherein said PMD transmit and receive interface comprises a 10 Gigabit serial transmit differential interface and a 10 Gigabit serial receive differential interface.

11. The system of claim 1, further comprising a 2-wire controller communicating with said at least one register and said two interfaces.

12. The system of claim 1, further comprising a plurality of local registers.

13. A single chip multi-sublayer PHY system comprising:
at least one register adapted to store local data;
two interfaces, at least one of said two interfaces communicating with said register, said two interfaces adapted to enable communication with at least one EEPROM;
at least one transmit module; and
at least one receive module.

14. The system of claim 13, wherein said at least one transmit module comprises PMD and XAUI transmit modules.

15. The system of claim 13, wherein said at least one receive module comprises PMD and XAUI receive modules.

16. The system of claim 13, wherein said at least one interface comprises a management data input/output interface.

17. The system of claim 13, wherein said at least one interface comprises an XAUI transmit and receive interface.

18. The system of claim 17, wherein said XAUI transmit and receive interface comprises 4 channels of 3 Gigabit data received by and 4 channels of 3 Gigabit data transmitted by the single chip multi-sublayer PHY.

19. The system of claim 13, wherein said at least one interface comprises a PMD transmit and receive interface.

20. The system of claim 19, wherein said PMD transmit and receive interface comprises a 10 Gigabit serial transmit differential interface and a 10 Gigabit serial receive differential interface.

21. The system of claim 13, further comprising a 2-wire controller communicating with said at least one register and said two interfaces.

22. The system of claim 13, further comprising a plurality of local registers.

* * * * *